(12) United States Patent
Tretter

(10) Patent No.: US 6,882,485 B2
(45) Date of Patent: Apr. 19, 2005

(54) METHOD AND SYSTEM TO MEASURE THE WRITE CURRENT OF A CURRENT MODE WRITE DRIVER IN A DIRECT WAY

(75) Inventor: Larry L. Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/283,753

(22) Filed: Oct. 30, 2002

(65) Prior Publication Data

US 2004/0085666 A1 May 6, 2004

(51) Int. Cl.[7] .............................................. G11B 27/36
(52) U.S. Cl. .......................................... 360/31; 360/68
(58) Field of Search .............................. 360/68, 31, 66, 360/63, 46, 67; 327/108, 110; 324/210, 212, 226

(56) References Cited

U.S. PATENT DOCUMENTS

| | | | |
|---|---|---|---|
| 4,967,291 A | 10/1990 | Touchton et al. | |
| 5,726,821 A | 3/1998 | Cloke et al. | |
| 5,844,743 A | 12/1998 | Funches | |
| 6,229,273 B1 | 5/2001 | Kelly et al. | |
| 6,256,158 B1 | 7/2001 | Brown et al. | |
| 6,310,740 B1 | 10/2001 | Dunbar | |
| 6,424,475 B1 * | 7/2002 | Bhandari et al. | 360/31 |
| 2003/0081339 A1 * | 5/2003 | Barnett et al. | 360/67 |

\* cited by examiner

Primary Examiner—Alan T. Faber
(74) Attorney, Agent, or Firm—Scully, Scott, Murphy & Presser; Jean M. Barkley

(57) ABSTRACT

A method and system for calibrating the write current of a current mode write driver having a first PFET coupled to a first NFET at a first node connected to a first side of a write head of the write driver, and a second PFET coupled to a second NFET at a second node connected to a second side of the write head. The write driver also defines an INODE where a source of the first NFET is coupled to a source of the second NFET, and the write driver is put in a state where all FET devices are in an off condition. A precision resistor R is connected from the NODE I/O pin of the write driver to a positive potential VDD I/O pin of the write driver, causing a current I1 to flow, where I1=V/R, and V is a voltage across the resistor.

20 Claims, 2 Drawing Sheets

METHOD AND SYSTEM TO MEASURE THE WRITE CURRENT OF A CURRENT MODE WRITE DRIVER IN A DIRECT WAY

BACKGROUND OF THE INVENTION

1. Field of the Invention

The present invention relates generally to a method and system for measuring the write current of a current mode write driver in a direct way, and also pertains to a current mode write driver, controlled by programming to produce a programmed write current, that precisely measures its actual write current produced in response thereto, such that the current mode write driver can be reprogrammed to calibrate its write current to a more accurate value. The current mode write driver is typically used in a tape or disk drive system to write data onto a recording tape or disk.

2. Discussion of the Prior Art

FIG. 1 shows a simple current mode write driver (as opposed to a voltage mode write driver) as is currently used in the art. For this current mode write driver, the current though the write head is determined by the value of the current source I1. For this current mode write driver, the current through the write head L1 is not a function of the voltage V1, but is determined by the magnitude of the current produced by the current source I1. A typical tolerance for the current source I1 in an integrated write driver ASIC chip is 7 to 10%. This means that if the current source is programmed for a current value of 40 milliamps, then it could be as high as 44 milliamps or as low as 36 milliamps. If there were a way to precisely measure the write current directly, then a correlation table could be established to provide a more accurate current setting of the write driver.

In FIG. 1, the devices P3 and P4 are PMOS FET (PFET) devices, while the devices N1 and N2 are NMOS FET (NFET) devices, with FIG. 1 illustrating the connections of each device to its source s, drain d, gate g and also to the substrate Sb.

The current mode write driver has a first PFET P3 coupled to a first NFET N1 at a first node which is connected to a first side of a write head of the write driver, and a second PFET P4 coupled to a second NFET N2 at a second node which is connected to a second side of the write head, and defines an INODE at an I/O (input/output) pin where a source of the first NFET is coupled to a source of the second NFET and are coupled to a programmed current source.

For a normal writing operation, the inputs IN1P/IN1N are opposite to the inputs IN2P/IN2N. For example, if IN1P and IN1N are at a zero voltage potential, while IN2P and IN2N are at a potential V1, then the FET devices P3 and N2 are on and have a very low resistance, while the FET devices P4 and N1 are off and have a very high resistance. This causes the write current I1 to flow in the direction from V1 through P3, L1, and N2. Conversely, if IN1P/IN1N are at a voltage level of V1 while IN2P/IN2N are at a zero voltage potential, then the devices N1/P4 are on and the devices N2/P3 are off. This causes the write current I1 to flow in the direction from V1 through P4, L1, and N1.

SUMMARY OF THE INVENTION

Accordingly, it is a primary object of the present invention to provide a method and system to measure the write current of a current mode write driver in a direct way.

A further object of the subject invention is the provision of a current mode write driver, controlled by programming to produce a programmed write current, that precisely measures its actual write current produced in response thereto, such that the current mode write driver can be reprogrammed to calibrate its write current to a more accurate value.

In accordance with the teachings herein, the present invention provides an exact value of the write current used in a writing process for tape or disk drives. This is very useful as without a calibration method, the tolerance of the write current of an integrated current mode write driver is typically about 7 to 10%. The present invention allows a calibration of the write current to establish a much smaller tolerance error.

The present invention provides a method and system for calibrating the write current of a current mode write driver having a first PFET coupled to a first NFET at a first node which is connected to a first side of a write head of the write driver, and a second PFET coupled to a second NFET at a second node which is connected to a second side of the write head. The current mode write driver also defines an INODE where a source of the first NFET is coupled to a source of the second NFET, and the current mode write driver is put in a state where all four FET devices are in an off condition. A precision resistor R is connected from the INODE I/O pin of the write driver to a positive potential VDD I/O pin of the write driver, such that a current I1 is caused to flow. Then the actual value of I1 is calculated by first measuring the voltage V across the precision resistor and then calculating the precise current from I1=V/R.

BRIEF DESCRIPTION OF THE DRAWINGS

The foregoing objects and advantages of the present invention for a method and system to measure the write current of a current mode write driver in a direct way may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE INVENTION

Figure 1:
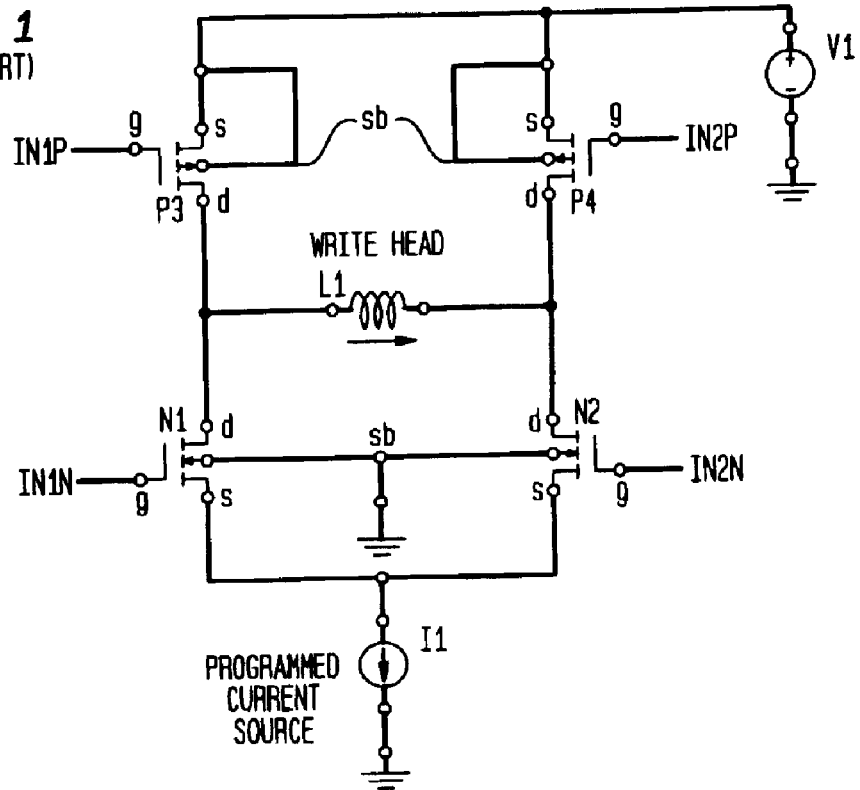
FIG. 1 shows a simple current mode write driver as is currently used in the art.
Figure 2:
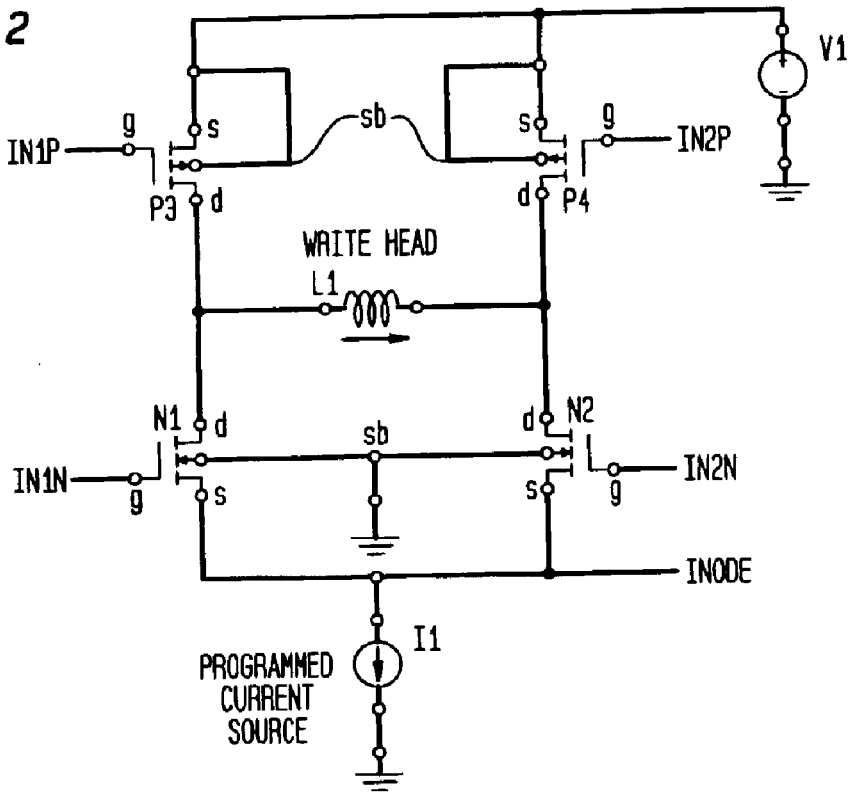
FIG. 2 shows the current mode write driver of FIG. 1 with an additional node INODE I/O pin added thereto to enable a measurement of the write current of the current mode write driver.
Figure 3:
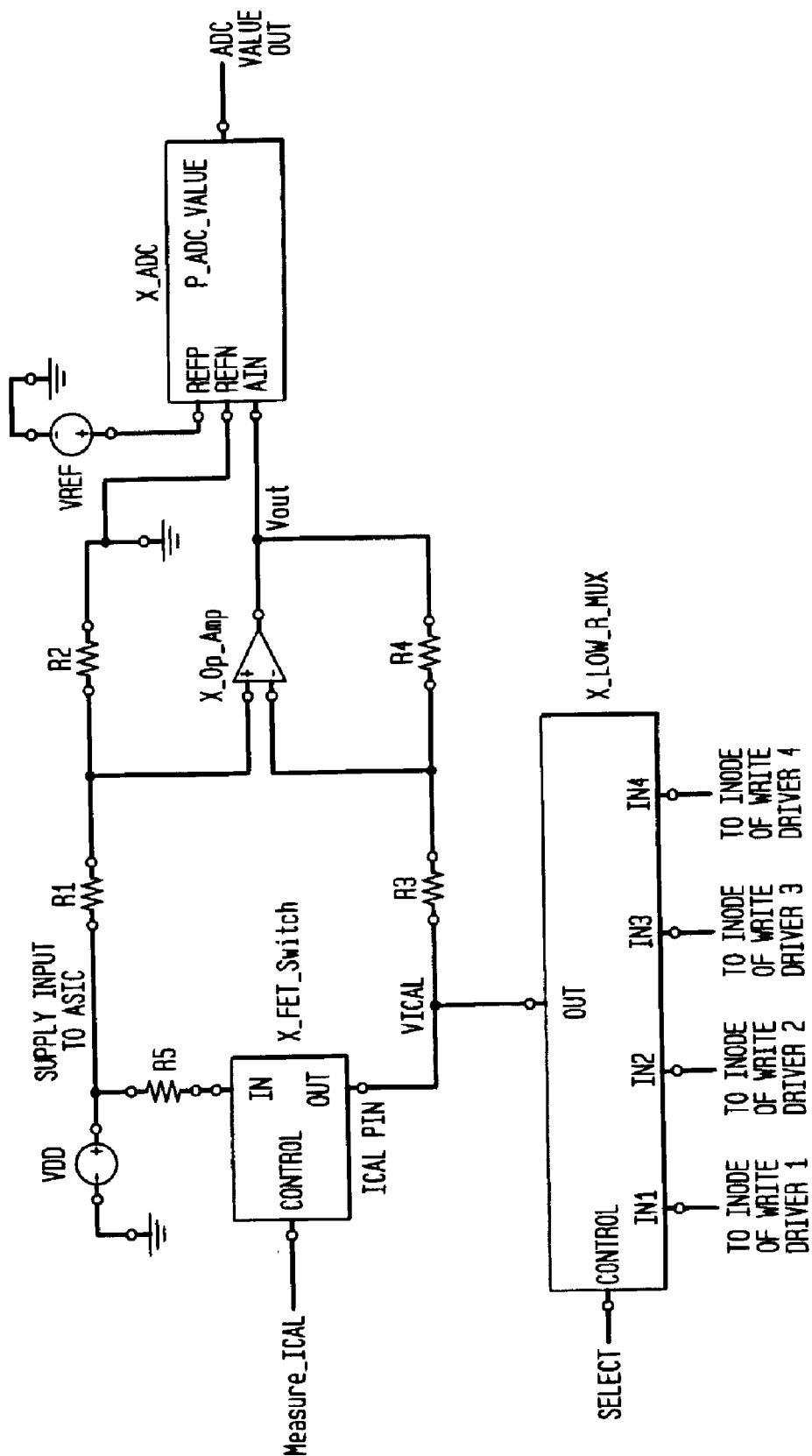
FIG. 3 is a high level diagram of a system for calibrating the write current of the current mode write driver of FIG. 2 pursuant to the present invention.

FIG. 2 shows the current mode write driver of FIG. 1 with an additional node INODE I/O pin added thereto to enable a measurement of the write current of the current mode write driver. FIG. 3 is a high level diagram of a system for implementing a method for calibrating the write current of the current mode write driver of FIG. 2.

Referring to FIG. 2, if the inputs IN1P/IN2P are at a V1 voltage potential, and the inputs IN1N/IN2N are at a zero voltage potential, then all four FET devices are off. The current mode write driver of FIG. 2 is initially put in the state where all four FET devices, N1, N2, P3 and P4, are in an off condition (the inputs IN1P/IN2P are at a V1 voltage potential, and the inputs IN1N/IN2N are at a zero voltage potential, such that all four FET devices are off). Then, as illustrated in FIG. 3, a precision resistor R5, typically having an error tolerance of 1%, is connected from the INODE I/O pin of the write driver to a positive potential VDD I/O pin of the write driver, causing a current I1 (of FIG. 2) to flow.

In the circuit of FIG. 3, the multiplexer X__LOW__R__MUX can connect the INODE of one of four different write drivers 1–4 to the precision resistor R5 through an off chip FET switch X__FET__Switch, although a similar switch could also be implemented on the chip. The multiplexer simply allows a number (which could be any number, although four are illustrated) of different write drivers to be calibrated in turn, and in a simplified embodiment could be eliminated in favor of a direct connection to a single write driver being calibrated.

The write driver is typically implemented in an ASIC which has a number of I/O pins, including a VDD I/O pin, an ICAL I/O pin and a ground pin. The present invention connects to two of those I/O pins, the VDD I/O pin and the ICAL I/O pin, across which the precision resistor R5 and the off chip FET switch are connected. The FET switch is controlled in response to an input Measure__ICAL to be either on (closed) or off (open). The on resistance of the FET switch is less than 0.005 the value of the resistor R5, and so can be effectively ignored. The actual value of I1 is precisely calculated by measuring the voltage across the resistor R5, and then calculating the precise current from I1=V/R5.

The function of the X__FET__Switch is to connect (for the calibration measurement) or disconnect the ICAL I/O pin of the ASIC from the voltage supply VDD at the VDD I/O pin by way of the resistor R5. The voltage supply VDD is on all the time, while the write voltage V1 is sometimes turned off.

The function of the Op Amp block X__Op__Amp is to generate a voltage proportional to the voltage across the precision resistor R5. The operational amplifier is coupled to the precision resistor R5 through series resistors R1 and R2, with their junction connected to a positive input of the operational amplifier, and also coupled through series resistors R3 and R4, with their junction connected to a negative input of the operational amplifier.

If R1=R3 and R2=R4, then the output voltage from the Op Amp is $$Vout=(R2/R1)(VDD-Vical).$$

This is the voltage across R5 times a scaling factor of R2/R1, and ignores the negligible drop of the X__FET__Switch. This method eliminates the tolerance of the supply voltage VDD, as the same supply voltage VDD that supplies the chip which includes the write driver is used in the calibration measurement, and so variations in VDD do not adversely effect the calibration measurement. This approach also saves an I/O pin in an integrated ASIC chip application, as a separate I/O pin is not required to power the calibration measurement, as the existing VDD I/O pin is used for the calibration measurement.

The voltage Vout is measured by an analog to digital converter X__ADC. The output of the ADC can be used by the firmware (code) of the tape or disk drive system (in which the current write driver is used) to calculate the precise value of the current I1 using a relation of Iactual=(Vout(R1/R2))/R5.

While several embodiments and variations of the present invention for a method and system to measure the write current of a current mode write driver in a direct way are described in detail herein, it should be apparent that the disclosure and teachings of the present invention will suggest many alternative designs to those skilled in the art.

Having thus described our invention, what we claim and desire to secure by Letters Patent is:

1. A system for calibrating a write current of a current mode write driver comprising:

the current mode write driver having a first PFET coupled to a first NFET at a first node which is connected to a first side of a write head of the write driver, and a second PFET coupled to a second NFET at a second node which is connected to a second side of the write head, and defines an INODE where a source of the first NFET is coupled to a source of the second NFET and are coupled to a programmed current source, and the current mode write driver is put in a state where all four FET devices are in an off condition;

a precision resistor R, connected from the INODE of the write driver to a positive potential, such that a current I1 is caused to flow through the precision resistor, wherein a voltage V across the precision resistor is measured and then the actual value of the current I1 is precisely calculated from I1=V/R.

2. The system of claim 1, wherein a multiplexer connects a single one of a plurality of current mode write drivers to the precision resistor through an FET switch.

3. The system of claim 1, wherein the INODE connects to an INODE I/O pin.

4. The system of claim 3, wherein the off chip FET switch disconnects an ICAL I/O pin of an ASIC chip implementing the current mode write driver from an external voltage supply VDD I/O pin by way of the precision resistor.

5. The system of claim 1, wherein an operational amplifier is connected to the precision resistor to generate a voltage proportional to the voltage across the precision resistor.

6. The system of claim 5, wherein the operational amplifier is coupled to the precision resistor through series resistors R1 and R2, with their junction connected to a positive input of an operational amplifier, and is also coupled through series resistors R3 and R4, with their junction connected to a negative input of the operational amplifier.

7. The system of claim 6, wherein a voltage Vout of the operational amplifier is converted to a digital value by an analog to digital converter.

8. The system of claim 1, wherein the system eliminates a tolerance of the supply voltage VDD, and saves an I/O pin in an integrated ASIC chip implementing the current mode write driver.

9. A tape or disk drive system to write data onto a recording medium with a current made write driver having a system for calibrating a write current of the current mode write driver comprising:

the current mode write driver having a first PFET coupled to a first NFET at a first node which is connected to a first side of a write head of the write driver, and a second PFET coupled to a second NFET at a second node which is connected to a second side of the write head, and defines an INODE where a source of the first NFET is coupled to a source of the second NFET and are coupled to a programmed current source, and the current mode write driver is put in a state where all four FET devices are in an off condition;

a precision resistor R, connected from the INODE of the write driver to a positive potential, such that a current I1 is caused to flow through the precision resistor, wherein a voltage V across the precision resistor is measured and then the actual value of the current I1 is precisely calculated from I1=V/R.

10. The tape or disk drive system of claim 9, wherein a voltage Vout of the operational amplifier is converted to a digital value by an analog to digital converter, and the output of the analog to digital converter is used by firmware of the drive to calculate the precise value of the current I1.

11. A method for calibrating a write current of a current mode write driver comprising a first PFET coupled to a first NFET at a first node which is connected to a first side of a write head of the write driver, and a second PFET coupled to a second NFET at a second node which is connected to a second side of the write head, and defines an INODE where a source of the first NFET is coupled to a source of the second NFET and are coupled to a programmed current source, comprising:

putting the current mode write driver in a state where all four FET devices are in an off condition;

connecting a precision resistor R from the INODE of the write driver to a positive potential, such that a current I1 is caused to flow;

measuring a voltage V across the precision resistor; and calculating the precise current from I1=V/R.

12. The method of claim 11, including connecting a single one of a plurality of current mode write drivers through a multiplexer to the precision resistor through an FET switch.

13. The method of claim 11, including connecting the INODE to an INODE I/O pin.

14. The method of claim 13, wherein the off chip FET switch disconnects an ICAL I/O pin of an ASIC chip implementing the current mode write driver from a voltage supply VDD I/O pin of the ASIC chip by way of the precision resistor.

15. The method of claim 11, including connecting an operational amplifier to the precision resistor to generate a voltage proportional to the voltage across the precision resistor.

16. The method of claim 15, including coupling the operational amplifier to the precision resistor through series resistors R1 and R2, with their junction connected to a positive input of the operational amplifier, and also through series resistors R3 and R4, with their junction connected to a negative input of the operational amplifier.

17. The method of claim 16, including converting a voltage Vout of the operational amplifier to a digital value by an analog to digital converter.

18. The method of claim 11, wherein the method eliminates tolerance of the supply voltage VDD, and saves an I/O pin in an integrated ASIC chip implementing the current mode write driver.

19. A method of operating a tape or disk drive system to write data onto a recording medium with a current mode write driver, including calibrating a write current of the current mode write driver which comprises a first PFET coupled to a first NFET at a first node which is connected to a first side of a write head of the write driver, and a second PFET coupled to a second NFET at a second node which is connected to a second side of the write head, and defines an INODE where a source of the first NFET is coupled to a source of the second NFET and are coupled to a programmed current source, by:

putting the current mode write driver in a state where all four FET devices are in an off condition;

connecting a precision resistor R from the INODE of the write driver to a positive potential, such that a current I1 is caused to flow;

measuring a voltage V across the precision resistor; and calculating the precise current from I1=V/R.

20. The method of claim 19, including converting with an analog to the digital converter a voltage Vout of the operational amplifier to a digital value, and the output of the analog to digital converter is used by firmware of the tape or disk drive system to calculate the precise value of the current I1.

* * * * *